US009333467B2

(12) United States Patent
Jang et al.

(10) Patent No.: US 9,333,467 B2
(45) Date of Patent: May 10, 2016

(54) APPARATUS FOR MANUFACTURING POLISHING PAD AND METHOD OF MANUFACTURING POLISHING PAD USING THE SAME

(71) Applicant: SAMSUNG ELECTRONICS CO., LTD., Suwon-si, Gyeonggi-do (KR)

(72) Inventors: Youngjun Jang, Suwon-si (KR); Bong-Su Ahn, Seoul (KR); Jin-Su Jeong, Seoul (KR); Jungsik Choi, Seongnam-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 153 days.

(21) Appl. No.: 14/301,823

(22) Filed: Jun. 11, 2014

(65) Prior Publication Data

US 2014/0366396 A1    Dec. 18, 2014

(30) Foreign Application Priority Data

Jun. 12, 2013 (KR) ........................ 10-2013-0067218

(51) Int. Cl.
*F26B 21/06* (2006.01)
*B01F 7/00* (2006.01)
*B29B 7/40* (2006.01)
*B24B 37/24* (2012.01)
*B24D 18/00* (2006.01)
*B01F 15/06* (2006.01)

(52) U.S. Cl.
CPC ........... *B01F 7/00491* (2013.01); *B01F 15/065* (2013.01); *B24B 37/24* (2013.01); *B24D 18/00* (2013.01); *B29B 7/401* (2013.01); *B01F 2015/062* (2013.01)

(58) Field of Classification Search
CPC .......... F26B 11/00; F26B 19/00; F26B 21/00; F26B 21/06; B01F 15/00; B01F 15/0266; B24D 3/20; B24D 3/26
USPC .............. 34/381, 413, 497, 201; 451/41, 527; 396/144, 194
See application file for complete search history.

(56) References Cited

U.S. PATENT DOCUMENTS

| 5,533,923 A * | 7/1996 | Shamouilian ........... B24B 37/26 451/36 |
| 5,624,304 A * | 4/1997 | Pasch ...................... B24B 37/22 451/159 |
| 5,643,406 A * | 7/1997 | Shimomura ............ B24B 37/04 156/345.13 |
| 6,272,768 B1 * | 8/2001 | Danese ............. H01L 21/67086 34/202 |
| 6,837,781 B2 | 1/2005 | Hishiki |
| 6,896,593 B2 | 5/2005 | Prasad |
| 6,901,684 B2 * | 6/2005 | Ito ........................ C01F 17/0043 34/305 |
| 6,986,705 B2 | 1/2006 | Preston et al. |

(Continued)

FOREIGN PATENT DOCUMENTS

JP    WO 0191975 A1 *  12/2001   .............. B24B 37/24
KR    10-2006-0057504 A      5/2006

(Continued)

*Primary Examiner* — Stephen M Gravini
(74) *Attorney, Agent, or Firm* — Lee & Morse, P.C.

(57) ABSTRACT

An apparatus for manufacturing a polishing pad includes a housing including a body, an interconnection portion, and a discharging portion, and a stirrer located in the housing, the stirrer mixing a polishing pad composition and a pore forming material with each other. A diameter of the discharging portion is in a range of about 9 mm to about 16 mm.

15 Claims, 6 Drawing Sheets

(56) References Cited

U.S. PATENT DOCUMENTS

| | | | |
|---|---|---|---|
| 7,118,469 B1* | 10/2006 | Lee | B24D 11/001 |
| | | | 249/83 |
| 7,275,928 B2* | 10/2007 | Kolesar | B29C 39/006 |
| | | | 366/137 |
| 7,396,497 B2 | 7/2008 | Koetas et al. | |
| 7,399,437 B2 | 7/2008 | James et al. | |
| 8,844,158 B2* | 9/2014 | Dehn | A61F 13/00008 |
| | | | 156/305 |
| 2002/0016139 A1* | 2/2002 | Hirokawa | B24B 37/24 |
| | | | 451/54 |
| 2002/0193051 A1* | 12/2002 | Homma | B24B 37/042 |
| | | | 451/41 |
| 2006/0022368 A1 | 2/2006 | Lee et al. | |
| 2006/0108701 A1 | 5/2006 | Saikin | |
| 2006/0110488 A1 | 5/2006 | Saikin | |
| 2010/0247868 A1 | 9/2010 | Cha et al. | |
| 2014/0366396 A1* | 12/2014 | Jang | B01F 7/00491 |
| | | | 34/381 |

FOREIGN PATENT DOCUMENTS

| | | | | |
|---|---|---|---|---|
| KR | 10-2006-0057506 A | | 5/2006 | |
| KR | 10-0963968 B1 | | 6/2010 | |
| KR | 20140144959 A | * | 12/2014 | ......... B01F 7/00491 |
| SG | EP 1000705 A2 | * | 5/2000 | ............. B24B 37/11 |

* cited by examiner

APPARATUS FOR MANUFACTURING POLISHING PAD AND METHOD OF MANUFACTURING POLISHING PAD USING THE SAME

CROSS-REFERENCE TO RELATED APPLICATION

Korean Patent Application No. 10-2013-0067218, filed on Jun. 12, 2013, in the Korean Intellectual Property Office, and entitled: "Apparatus For Manufacturing Polishing Pad and Method Of Manufacturing Polishing Pad Using The Same," is incorporated by reference herein in its entirety.

BACKGROUND

1. Field

Embodiments relate to an apparatus for manufacturing a polishing pad and methods of manufacturing a polishing pad using the same. More particularly, embodiments relate to apparatuses for manufacturing a polishing pad applied to a chemical mechanical polishing (CMP) apparatus and methods of manufacturing a polishing pad using the same.

2. Description of the Related Art

A chemical mechanical polishing (CMP) process uses combination of a mechanical effect by an abrasive and a chemical reaction effect by an acidic or basic solution to planarize a wafer surface.

SUMMARY

Embodiments are directed to an apparatus for manufacturing a polishing pad including a housing including a body, an interconnection portion, and a discharging portion, and a stirrer to mix a polishing pad composition and a pore forming material with each other, the stirrer being located in the housing. A diameter of the discharging portion is in a range of about 9 mm to about 16 mm.

The discharging portion may discharge the polishing pad composition mixed with the pore forming material at a velocity of about 10 kgf/min to about 30 kgf/min through the discharging portion.

The discharging portion may include polyvinyl chloride (PVC).

The apparatus may further include a drying container facing the discharging portion and spaced apart from the discharging portion.

The apparatus may further include a heating part that increases a temperature of the polishing pad composition and the pore forming material in the housing.

The polishing pad composition may include at least one selected from the group of a polyethylene resin, a polypropylene resin, a polystyrene resin, a polyvinylchloride resin, a polyamide resin, an acryl resin, a polyurethane resin, a polycarbonate resin, a phenol resin, an amino resin, an epoxy resin, a polyester resin, rubber, acrylonitrile butadiene styrene (ABS), and a styrene acrylonitrile copolymer (SAN).

The pore forming material may include an inert gas, an encapsulating blowing agent, and/or a chemical blowing agent.

Embodiments are also directed to a method of manufacturing a polishing pad, including providing a polishing pad composition and a pore forming material in a mixing chamber, mixing the polishing pad composition and the pore forming material by a stirrer of the mixing chamber to form pores in the polishing pad composition, discharging the polishing pad composition including the pores from the mixing chamber through a discharging portion of the mixing chamber at a velocity of about 10 kgf/min to about 30 kgf/min, drying the discharged polishing pad composition including the pores to form a polishing pad mold, and cutting the polishing pad mold to form polishing pads.

A diameter of the discharging portion may be in the range of about 9 mm to about 16 mm.

The mixing chamber may be heated at a temperature of about 70° C. to about 85° C.

A portion of the pore forming material may remain in the polishing pad composition discharged through the discharging portion such that the remaining pore forming material additionally generates pores in the discharged polishing pad composition.

Embodiments are also directed to an apparatus for manufacturing a polishing pad, including a housing including a body, an interconnection portion, and a discharging portion, and a drying container spaced apart from and facing the discharging portion. The discharging portion of the housing is configured to discharge a mixture of a polishing pad composition and a pore forming material from the housing to the drying container at a velocity of about 10 kgf/min to about 30 kgf/min.

A diameter of the discharging portion may be in a range of about 9 mm to about 16 mm.

The housing may include a stirrer located in the housing, the stirrer mixing the polishing pad composition and the pore forming material with each other in the housing to form the mixture of the polishing pad composition and the pore forming material.

The apparatus may further include a heater that heats the mixture of the polishing pad composition and the pore forming material in the housing.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

The terminology used herein is for the purpose of describing particular embodiments only and is not intended to limit the invention. As used herein, the singular terms "a," "an" and "the" are intended to include the plural forms as well, unless the context clearly indicates otherwise. As used herein, the term "and/or" includes any and all combinations of one or more of the associated listed items.

It will be also understood that although the terms first, second, third etc. may be used herein to describe various elements, these elements should not be limited by these terms. These terms are only used to distinguish one element from another element. Thus, a first element in some embodiments could be termed a second element in other embodiments without departing from the teachings of the present invention. Exemplary embodiments of aspects of the present inventive concepts explained and illustrated herein include their complementary counterparts.

Apparatus for Manufacturing Polishing Pad

Figure 1:
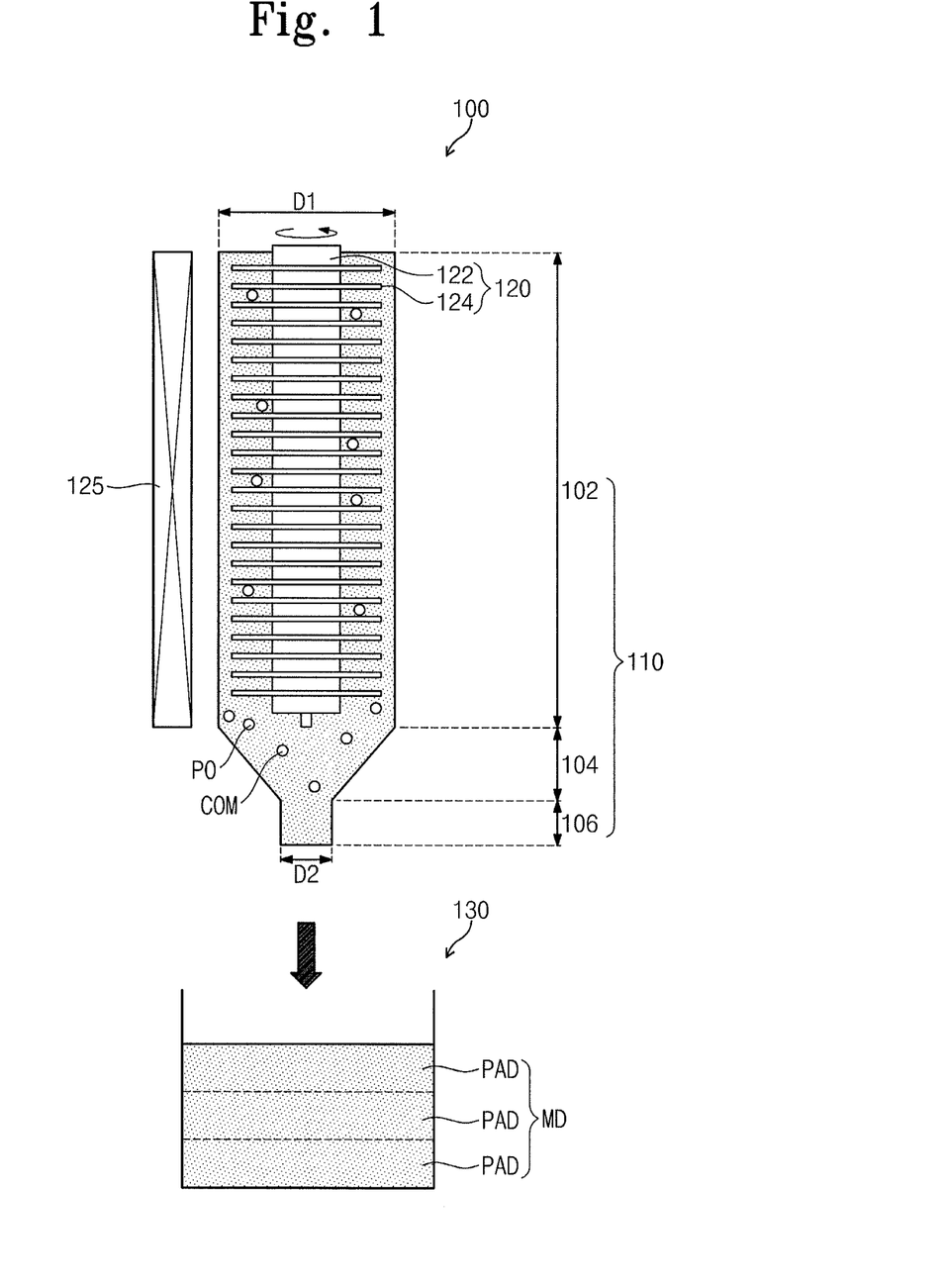
FIG. 1 illustrates a cross-sectional view depicting an apparatus for manufacturing a polishing pad according to embodiments.

FIG. 1 illustrates a cross-sectional view depicting an apparatus for manufacturing a polishing pad according to embodiments.

The apparatus for manufacturing the polishing pad may include a mixing chamber 100 and a drying container 130.

The mixing chamber 100 may include a housing 110 and a stirrer 120.

The housing 110 may include a body 102, a discharging portion 106, and an interconnection portion 104 connecting the body 102 to the discharging portion 106.

The body 102 may provide a space for mixing a polishing pad composition COM and a pore forming material PO with each other. The polishing pad composition COM may include at least one selected from a group of a polyethylene resin, a polypropylene resin, a polystyrene resin, a polyvinylchloride resin, a polyamide resin, an acryl resin, a polyurethane resin, a polycarbonate resin, a phenol resin, an amino resin, an epoxy resin, a polyester resin, rubber, acrylonitrile butadiene styrene (ABS), and a styrene acrylonitrile copolymer (SAN). The pore forming material PO may include an inert gas (e.g., a nitrogen ($N_2$) gas), an encapsulating blowing agent, and/or a chemical blowing agent.

In some implementations, the body 102 may have a hollow cylinder shape extending in one direction. The body 102 may have a first diameter D1. One end of the body 102 may have a structure receiving the polishing pad composition COM and the pore forming material PO from the outside of the body 102. Another end of the body 102 may be opened in order to be connected to the discharging portion 106 through the interconnection portion 104. The body 102 may be formed of stainless steel, as an example.

The interconnection portion 104 may be disposed to be connected to a bottom end of the body 102. Both ends of the interconnection portion 104 may be open. A diameter of the interconnection portion 104 may become progressively smaller toward a bottom end of the interconnection portion 104. A sidewall of the interconnection portion 104 may have an inclined surface when viewed from a cross-sectional view taken along an extending direction of the body 102. For example, a diameter of a top end of the interconnection portion 104 may be equal to the first diameter D1 of the body 102. A bottom end of the interconnection portion 104 may have a second diameter D2 less than the first diameter D1. The interconnection portion 104 may have a width that becomes progressively smaller from the top end toward the bottom end of the inter connection portion 104. The interconnection portion 104 may also be formed of a stainless steel, as an example.

The discharging portion 106 may be disposed to be connected to the bottom end of the interconnection portion 104. Both of ends of the discharging portion 106 may be open. The discharging portion 106 may have a diameter substantially equal to the second diameter D2 of the bottom end of the interconnection portion 104.

According to some implementations, the diameter D2 of the discharging portion 106 may be in the range of about 9 mm to about 16 mm. If the diameter D2 of the discharging portion 106 is greater than about 9 mm, overflowing of the polishing pad composition COM mixed with the pore forming material (PO) and/or an increase in a pressure in the housing 110 may be prevented or avoided. On the other hand, if the diameter D2 of the discharging portion 106 is less than about 16 mm, pores may be uniformly generated in a complete polishing pad. For example, the diameter of the discharging portion 106 may be in the range of about 10 mm to about 11 mm. The discharging portion 106 may be formed of polyvinyl chloride (PVC).

According to some implementations, when the diameter of the discharging portion 106 is in the range of about 9 mm to about 16 mm, the polishing pad composition COM including the pore forming material PO may be discharged at a velocity of about 10 kgf/min to about 30 kgf/min. For example, the polishing pad composition COM may be discharged at a velocity of about 10 kgf/min.

The stirrer 120 may be disposed within the housing 110. For example, the stirrer 120 may be disposed within the body 102 of the housing 110.

According to some implementations, the stirrer 120 may include a cylinder-pillar 122 and a plurality of impellers 124 disposed along an outer circumference of the cylinder-pillar 122. The cylinder-pillar 122 may pass through a center of the housing 110 and may extend in substantially the same direction as the extending direction of the body 102. The cylinder-pillar 122 may be connected to a driving device (not shown) and may be rotated by the driving device. The impellers 124 may be spaced apart from each other by equal intervals in the extending direction of the cylinder-pillar 122. The number of the impellers 124 may be, for example, in the range of 8 to 20.

The impellers 124 may uniformly mix the polishing pad composition COM and the pore forming material PO with each other by the rotary motion of the cylinder-pillar 122. The pore forming materials PO mixed in the polishing pad composition COM may generate pores in the polishing pad composition COM.

A staying time of the polishing pad composition COMP and the pore forming material PO in the body 102 or in the interconnection portion 104 may be increased by providing the discharging portion 106 with the diameter of about 9 mm to about 16 mm, as mentioned above. Thus, the polishing pad composition COM and the pore forming material PO may be better mixed with each other. As a result, pores may be uniformly formed in the polishing pad composition COM.

The mixing chamber 100 may be connected to a heating part 125 in order to regularly maintain a temperature of the polishing pad composition COM in the housing 110. The heating part 125 may be disposed in the housing 110 or may be disposed to be adjacent to the housing 110. The temperature of the polishing pad composition COM in the housing 110 may be maintained at a temperature of about 60° C. to about 80° C. by the heating part 125.

Without being bound to any particular theory, property dispersion between completed polishing pads may be caused by a temperature grade difference of the polishing pad composition COM in the housing 110. Thus, the staying time of the polishing pad composition COM in the housing 110 may be selected in order to uniformly heat the entire polishing pad composition COM in the housing 110. According to some implementations, the discharging portion 106 may have a diameter in the range of about 9 mm to 16 mm in order to increase the staying time of the polishing pad composition COM. As a result, the polishing pad composition COM may be uniformly heated and then may be discharged from the housing 110.

The drying container 130 may be disposed to face the discharging portion 106. The drying container 130 may be spaced apart from the discharging portion 106. The drying container 130 may temporarily store the mixture supplied from the discharging portion 106 in order to dry the mixture. According to some embodiments, the drying container 130 may have a hollow cylinder-shape having a closed bottom.

As described above, when the diameter of the discharging portion 106 has a diameter of about 9 mm to about 16 mm, the polishing pad compound COM including the pores may be discharged at the velocity of about 10 kgf/min to about 30 kgf/min through the discharging portion 106. The polishing pad composition COM discharged at this velocity may include the uniformly distributed pore forming material PO, such that the pores may be uniformly distributed in the polishing pad composition COM.

The polishing pad composition COM including the pores may gel and be hardened in the drying container 130 to be formed into a polishing pad mold MD.

A portion of the pore forming material PO may remain in the polishing pad mold MD. The remaining pore forming material PO may additionally generate pores in the polishing pad mold MD. According to some embodiments, the pores at a surface of the polishing pad mold MD may be opened such that the pores in the polishing pad mold MD may be uniformly distributed.

The polishing pad mold MD in which the pores are generated may be cut to have a desired size, thereby forming polishing pads PAD. For example, a diameter of the drying container 130 may be substantially equal to a diameter of a desired polishing pad PAD. In this case, the polishing pad mold MD may be sliced in a direction parallel to the surface of the polishing pad mold MD having the diameter equal to the diameter of the drying container 130.

In some embodiments, the polishing pad mold MD of one drying container 130 may be cut to prepare three polishing pads PAD. Properties of the three polishing pads PAD may be similar to each other. The diameter of the discharging portion 106 may be in the range of about 9 mm to about 16 mm. The polishing pad composition COM and the pore forming material PO may be sufficiently uniformly mixed in the mixing chamber 100. The number of the pores in the polishing pads PAD may be increased, sizes of the pores may be reduced, and the pores may be distributed with a uniform density in the polishing pad PAD. Additionally, the polishing pad composition COM in which the pores are formed may be uniformly heated in the mixing chamber 100, such that the property dispersion of the polishing pads PAD may be reduced.

Hereinafter, an optimized diameter of the discharging portion may be obtained by predicting a volumetric flow and an internal pressure variation through numerical analysis.

Figure 2:
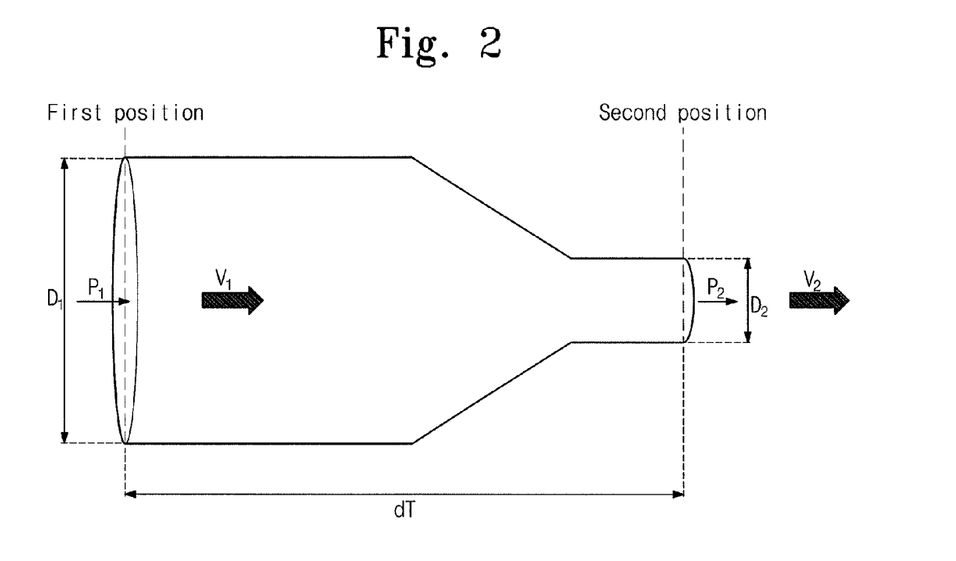
FIG. 2 illustrates a cross-sectional view of a cylinder for predicting a volumetric flow and an internal pressure variation.

FIG. 2 illustrates a cross-sectional view of a cylinder for predicting a volumetric flow and an internal pressure variation.

Referring to FIG. 2, a fluid flow of two cross-sectional positions of a cylinder is modeled. A velocity of a fluid at a first cross-sectional position (hereinafter, referred to as 'a first position') is defined as "$V_1$", a pressure of the first position is defined as "$P_1$", and a potential energy of the first position is defined as "$Z_1$". A velocity of a fluid at a second cross-sectional position (hereinafter, referred to as 'a second position') is defined as "$V_2$", a pressure of the second position is defined as "$P_2$", and a potential energy of the second position is defined as "$Z_2$".

The following Equation 1 represents Bernoulli's equation. A region between the two positions in the cylinder of FIG. 2 is defined as a control volume system by applying similitude. A polyurethane solution having a specific gravity of 0.8 is used as the fluid. If a pressure at the first position of FIG. 2 is 10 kgf/min and the diameter of the discharging portion is 19 mm, force acting at an end of the discharging portion and an internal resistance pressure of the body may be expressed through numerical values.

$$\frac{V_1^2}{2g} + \frac{P_1}{\gamma} + Z_1 = \frac{V_2^2}{2g} + \frac{P_2}{\gamma} + Z_2 \quad \text{[Equation 1]}$$

In Equation 1, "g" denotes the acceleration of gravity and "γ" denotes a density of the fluid.

There is no potential energy variation between the first position and the second position of FIG. 2. Thus, zero is substituted for "$Z_1$" and "$Z_2$" in the equation 1 ($Z_1=Z_2=0$), thereby obtaining the following equation 2.

$$\frac{V_1^2}{2g} + \frac{P_1}{\gamma} = \frac{V_2^2}{2g} + \frac{P_2}{\gamma} \quad \text{[Equation 2]}$$

The following Equations 3 and 4 are equations for calculating the velocity $V_1$ at the first position.

$$\frac{40 \, V_1^2}{g} = \frac{P_1}{\gamma} \quad \text{[Equation 3]}$$

$$V_1 = \sqrt{\frac{gP_1}{40\gamma}} \quad \text{[Equation 4]}$$

Figure 3:
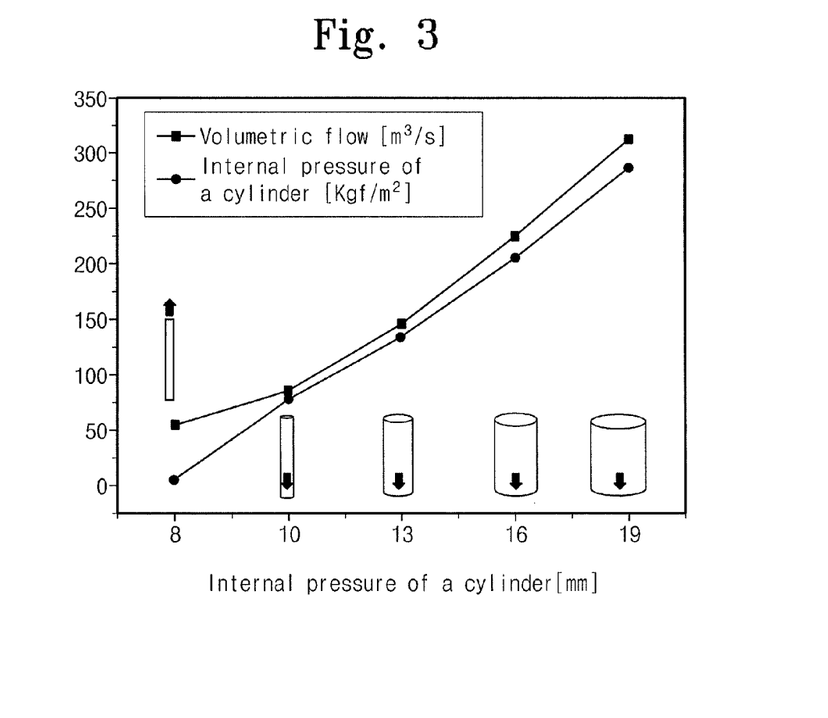
FIG. 3 illustrates a graph depicting a volumetric flow and a variation of an internal pressure of a housing according to a diameter of a discharging portion.

The following Equation 5 represents a momentum equation. The velocity $V_1$ and the velocity $V_2$ obtained from the Equation 4 and a solution of the volumetric flow are applied to the following Equation 5 to calculate an internal pressure of the body according to a diameter variation of the discharging portion. The calculated internal pressures are illustrated in FIG. 3.

$$\frac{d}{dt}(mv) = \sum F \quad \text{[Equation 5]}$$

$$\sum F dt = \rho_2 Q_2 dt V_2 - \rho_1 Q_1 dt V_1 \quad \text{[Equation 6]}$$

$$\sum F = \rho_2 Q_2 V_2 - \rho_1 Q_1 V_1 \quad \text{[Equation 7]}$$

$$\sum F = \rho Q(V_2 - V_1) \quad \text{[Equation 8]}$$

$$P_1A_1 - P_2A_2 - F_x = \rho Q(V_2 - V_1) \quad [\text{Equation 9}]$$

Generally, a flow of a fluid is a turbulent motion such that it may be too complicated and its modeling may be difficult. Thus, if a work is not applied to an ideal fluid, a relation equation between a velocity V, a pressure P, and a potential energy of the fluid may be established using the relation that a sum of all kinds of energies is constant on a streamline of the fluid. Thus, since the first position $Z_1$ and the second position $Z_2$ are on the same streamline, potential energies of the first and second positions $Z_1$ and $Z_2$ is zero (0) and only pressure and velocity terms remains. At this time, Newton's laws of motion may be applied to a region defined as a control volume, thereby obtaining the above equations.

FIG. 3 illustrates a graph depicting a volumetric flow and a variation of an internal pressure of a housing according to a diameter of a discharging portion.

Referring to FIG. 3, as the diameter of the discharging portion is progressively reduced from 19 mm to 8 mm, the internal resistance pressure of the housing is gradually reduced, and the volumetric flow of the fluid flowing through the housing is also reduced.

When the diameter of the discharging portion is 8 mm, the internal resistance pressure is close to zero (0). Thus, the polyurethane solution is predicted to overflow. When the diameter of the discharging portion is 10 mm, the graph of the volumetric flow meets the graph of the internal pressure variation. As the diameter of the discharging portion is increased from 10 mm to 19 mm, a space between the graphs becomes gradually wider.

Thus, the diameter of the discharging portion according to embodiments may be selected to be in the range of about 9 mm to about 16 mm.

Polishing Apparatus

Figure 4:
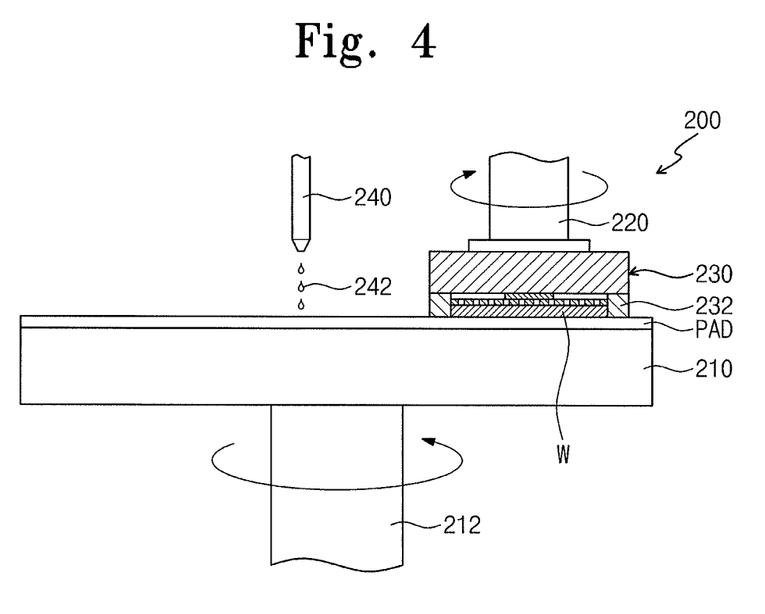
FIG. 4 illustrates a cross-sectional view depicting a chemical mechanical polishing (CMP) apparatus according to embodiments.

FIG. 4 illustrates a cross-sectional view depicting a chemical mechanical polishing (CMP) apparatus according to embodiments.

Referring to FIG. 4, a polishing apparatus may include a turning table 210 onto which a polishing pad PAD is bonded, a polishing head 230 facing the turning table 210, a slurry supplier 240 disposed to be adjacent to the polishing pad PAD, and a polishing pad conditioner (not shown).

The turning table 210 may have a disk-shape, and a driving part 212 may be connected to a lower portion of the turning table 210. The driving part 212 may provide turning force to the turning table 210. The polishing pad PAD for polishing a polishing target surface may be bonded onto a top surface of the turning table 210.

A plurality of pores may be formed in the polishing pad PAD. According to embodiments, the polishing pad PAD may be manufactured by the polishing pad manufacture apparatus described with reference to FIG. 1 such that sizes and a density of the pores may be uniform throughout the polishing pad PAD. The pores of the polishing pads PAD may receive slurry for chemically mechanically polishing the polishing target surface.

A polishing end point detector may be disposed within the turning table 210 in order to detect a polishing amount of the polishing target surface and a polishing end point. The polishing end point detector may include a light source emitting light, a splitter for reflecting the light to the polishing target surface, and a photodetector measuring the light reflected from the polishing target surface to detect the polishing amount of the polishing target surface and the polishing end point. In other implementations, a slot used as a light path may be formed in the turning table 210, and a transparent window for transmitting light may be formed in the polishing pad PAD.

The polishing head 230 may grip a substrate W having the polishing target surface so that the polishing target surface faces the turning table 210. Additionally, the polishing head 230 may press the polishing target surface against the polishing pad PAD during a chemical mechanical polishing process of the substrate W. The polishing head 230 may be connected to a driving part 220 capable of rotating the substrate W. A rotating direction of the polishing head 230 may be different from a rotating direction of the turning table 210. In other implementations, the rotating direction of the polishing head 230 may be the same as the rotating direction of the turning table 210.

An air-housing for gripping the substrate W and for pressing the polishing target surface of the substrate W on the polishing pad PAD may be formed within the polishing head 230. The substrate may be gripped and the polishing target surface of the substrate W may be pressed against the polishing pad PAD by enlargement and reduction of the air-housing. A retainer ring 232 fixing the substrate may be disposed on an edge of a bottom surface of the polishing head 230. The retainer ring 232 may be pressed against the polishing pad PAD along with the substrate W.

The slurry supplier 240 may provide slurry 242 onto the polishing pad PAD. The slurry 242 may include abrasive particles for mechanically polishing the substrate W.

The polishing pad conditioner may be disposed over the polishing pad PAD to jet pressurized vapor onto the surface of the polishing pad PAD, thereby improving a surface state of the polishing pad PAD.

A CMP process of planarizing the surface of the substrate W using the CMP apparatus described above will be described hereinafter.

The substrate W may be gripped by the polishing head 230 such that the polishing target surface of the substrate W may face the polishing pad PAD. The turning table 210 may be turned to rotate the polishing pad PAD. The substrate W may be pressed against a top surface of the rotating polishing pad PAD. At this time, the slurry 242 may be provided from the slurry supplier 240 onto the polishing pad PAD.

The polishing target surface of the substrate W may be chemically mechanically polished by the slurry 242 received in the pores of the polishing pad PAD and by the rotation of the polishing pad PAD. A mixture of a polishing byproduct generated by polishing the substrate W and the slurry 242 may fill the pores formed in the surface of the polishing pad PAD.

The mixture of the polishing byproduct and the slurry 242 may escape from the pores due to action of a conditioner supplied from the polishing pad conditioner and then may be removed from the polishing pad PAD by the rotation of the polishing pad PAD.

The following Examples and Comparative Examples are provided in order to highlight characteristics of one or more embodiments, but it is to be understood that the Examples and Comparative Examples are not to be construed as limiting the scope of the embodiments, nor are the Comparative Examples to be construed as being outside the scope of the embodiments. Further, it is to be understood that the embodiments are not limited to the particular details described in the Examples and Comparative Examples.

Experiment Example

Comparison Example

Polyurethane resin and a nitrogen gas were provided in a mixing chamber 100 described with reference to FIG. 1 and then were mixed with each other at a temperature of 80° C. The mixing chamber 100 included a stirrer 120 with ten impellers, and the cylinder-pillar 122 of the stirrer 120 was rotated at 6000 RPM (revolutions per minute). The mixing chamber 100 included a discharging portion 106 having a diameter of 19 mm. Pores were generated in the polyurethane resin exhausted through the mixing chamber 100 by the nitrogen gas.

The polyurethane resin including the pores was dried in the drying container 130 to form a polishing pad mold. Then, the polishing pad mold was sliced to form three polishing pads.

Embodiment Example

Three polishing pads were formed using a mixing chamber 100 having a discharging portion with a diameter of 10 mm. The remaining properties of the mixing chamber and conditions of the polishing pads according to the embodiment example were the same as corresponding properties and conditions of the comparison example.

Comparison of the Numbers, Sizes, and Densities of Pores

Figure 5A:
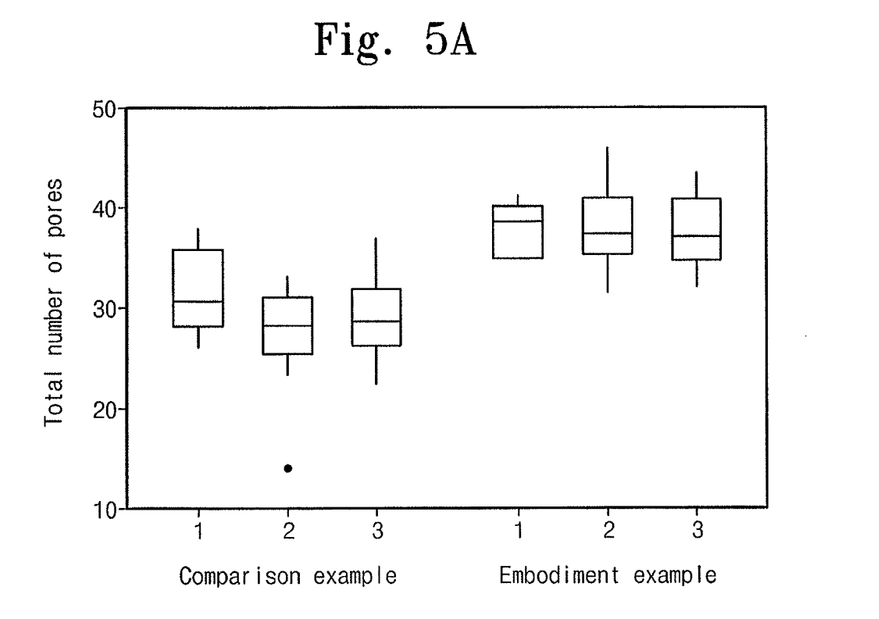
FIGS. 5A, 5B, and 5C illustrate graphs respectively depicting the numbers, sizes, and densities of polishing pads manufactured using the apparatus of FIG. 1.
Figure 5B:
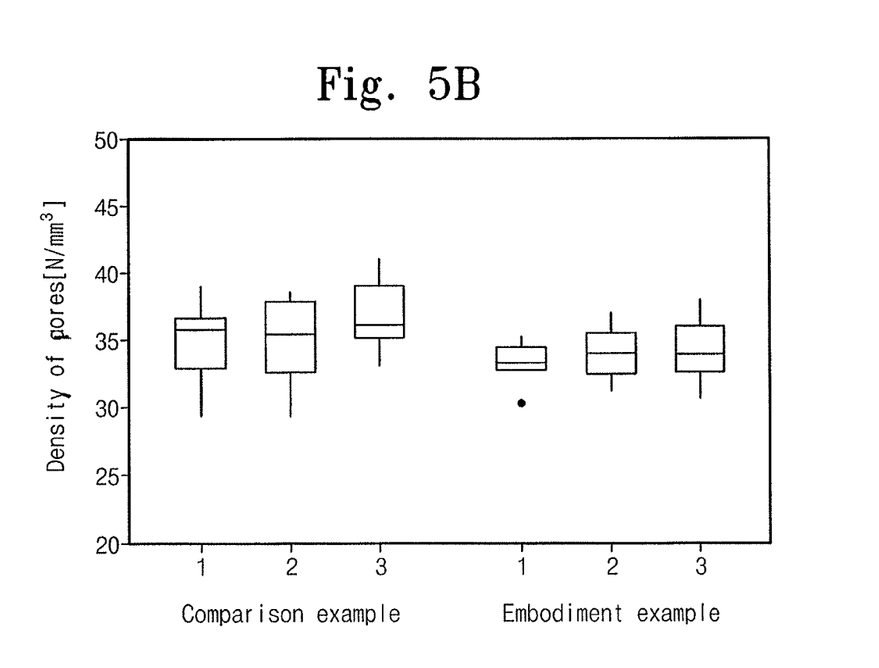
Figure 5C:
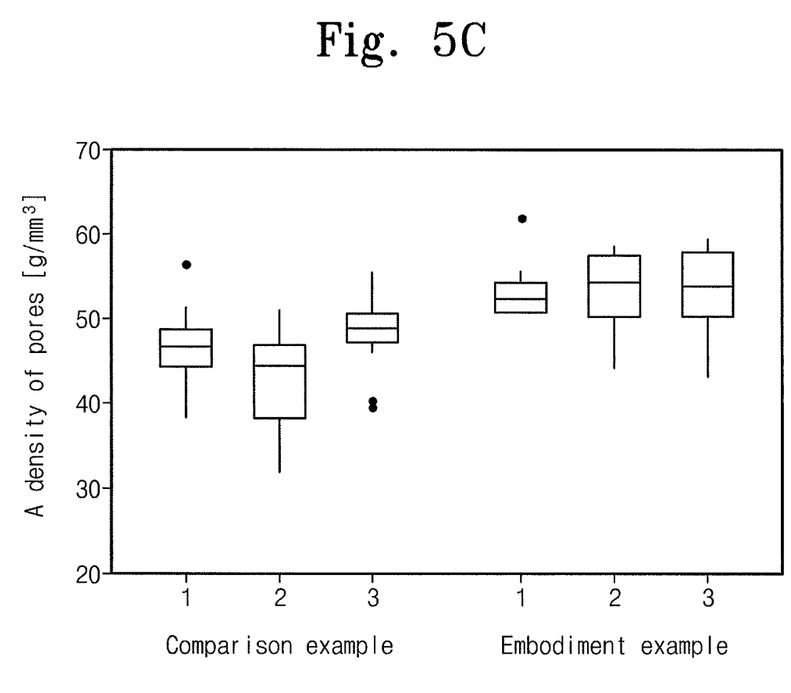

FIGS. 5A, 5B, and 5C illustrate graphs respectively showing the numbers, sizes, and densities of polishing pads manufactured using the apparatus of FIG. 1.

In FIG. 5A, an x-axis represents the three polishing pads of the comparison example and the three polishing pads of the embodiment example, and a y-axis represents the number of pores. Referring to FIG. 5A, the numbers of the pores of the polishing pads of the embodiment example are increased by about ten as compared with the numbers of the polishing pads of the comparison example.

Referring to FIG. 5B, an x-axis represents the three polishing pads of the comparison example and the three polishing pads of the embodiment example, and a y-axis represents a size of a pore. A unit of the size of the pore is [μm]. Sizes of the pores of the polishing pads of the embodiment example were reduced by 1 μm to 2 μm as compared with sizes of the pores of the polishing pads of the comparison example.

Referring to FIG. 5C, an x-axis represents the three polishing pads of the comparison example and the three polishing pads of the embodiment example, and a y-axis represents a density of pores. A unit of the density of the pore is [$g/mm^3$]. As illustrated in FIG. 5C, the densities of the pores of the polishing pads of the embodiment example are greater than the densities of the pores of the polishing pads of the comparison example.

According to the results of FIGS. 5A to 5C, the polishing pads manufactured using the apparatus including the discharging portion having the diameter of 10 mm (the embodiment example) have more excellent properties than the polishing pads manufactured using the apparatus including the discharging portion having the diameter of 19 mm (the comparison example).

Chemical Mechanical Polishing Rate

Each of the polishing pads of the embodiment example and the comparison example was installed in a CMP apparatus and then a CMP process was performed on a substrate.

Figure 6A:
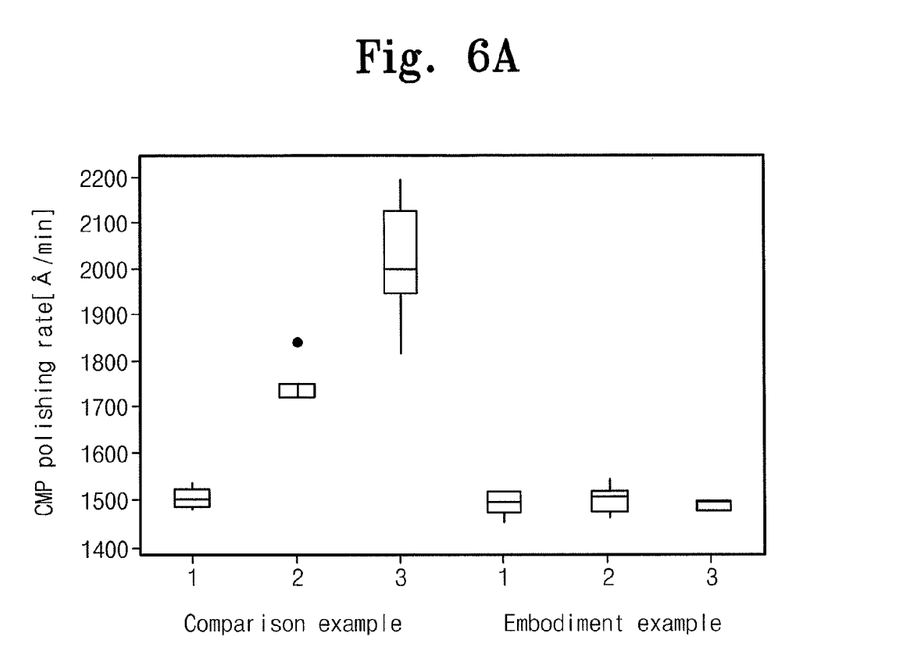
FIGS. 6A and 6B illustrate graphs respectively depicting chemical mechanical polishing rates and wear rates of polishing pads manufactured using the apparatus of FIG. 1 in chemical mechanical polishing processes using the polishing pads.

FIG. 6A illustrates a graph showing chemical mechanical polishing rates of polishing pads manufactured using the apparatus of FIG. 1 in chemical mechanical polishing processes using the polishing pads. An x-axis of FIG. 6A represents the three polishing pads of the comparison example and the three polishing pads of the embodiment example, and a y-axis of FIG. 6A represents a chemical mechanical polishing rate of which a unit is [Å/min].

According to the results of the CMP processes using the polishing pads of the comparison example, a polishing rate deviation between the three polishing pads sliced from one polishing pad mold was great.

On the other hand, according to the results of the CMP processes using the polishing pads of the embodiment example, the polishing rates of the three polishing pads are similar to each other (i.e., about 1,500 Å/min).

Wear Rate of Polishing Pad

Each of the polishing pads of the embodiment example and the comparison example was installed in a CMP apparatus and then a wear rate of each of the polishing pads was observed when a CMP process was performed using the CMP apparatus on a substrate.

Figure 6B:
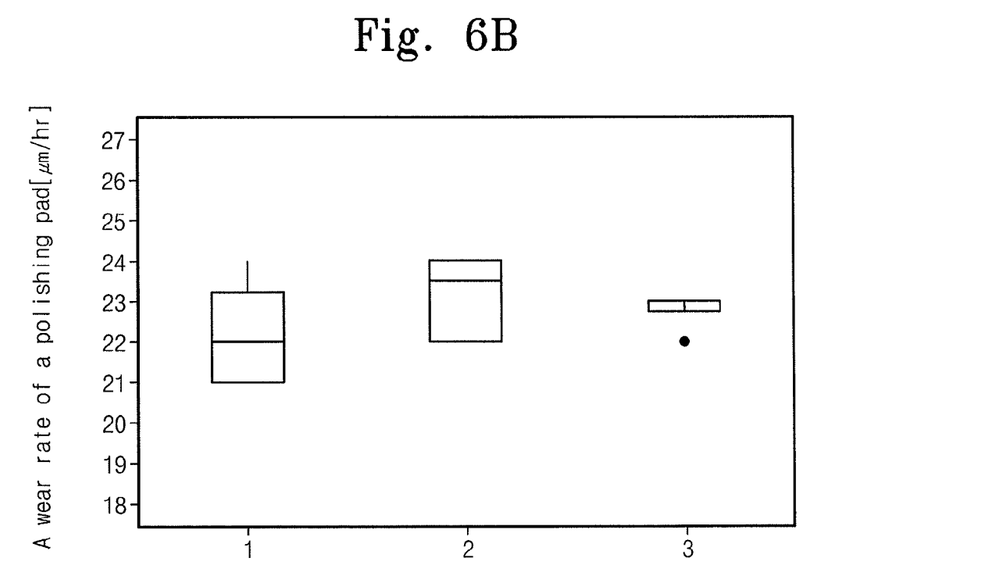

FIG. 6B illustrates a graph showing wear rates of polishing pads manufactured using the apparatus of FIG. 1 in chemical mechanical polishing processes using the polishing pads. In FIG. 6B, an x-axis represents three polishing pads sliced from one polishing pad mold, and a y-axis represents a wear rate of a polishing pad of which a unit is [μm/hr].

Wear rates of the polishing pads of the comparison example were similar to wear rates of the polishing pads of the embodiment example. A center value of the wear rates of the polishing pads of the comparison example was different from a center value of the wear rates of the polishing pads of the embodiment example. However, a difference between the center values of the comparison example and the embodiment example was in a several μm range such that it may be ignored.

By way of summation and review, a CMP apparatus may include a polishing pad, a polishing head pressing and rotating a wafer, and a slurry-supply part supplying slurry corresponding to a polishing solution. The slurry includes an abrasive and an acidic or basic solution. If the slurry is supplied onto the polishing pad, the polishing head rotates a wafer in the state that the wafer is in contact with the polishing pad. Thus, the acidic or basic solution reacts with a semiconductor device layer on the wafer, and mechanical polishing is performed by the abrasive.

A polishing efficiency of the CMP process may be affected by the CMP apparatus, a composition of the slurry, and the polishing pad. In particular, the distribution of pores of a polishing pad may affect the CMP process.

Embodiments may provide an apparatus for manufacturing a polishing pad having uniformly distributed pores. Embodiments may also provide methods of manufacturing a polishing pad using the apparatus.

According to embodiments, the size of a discharging portion of an apparatus for manufacturing the polishing pad may be controlled or selected, such that the sizes and densities of the polishing pads may be regularly maintained.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An apparatus for manufacturing a polishing pad, the apparatus comprising:

a housing including a body, an interconnection portion, and a discharging portion; and a stirrer to mix a polishing pad composition and a pore forming material with each other, the stirrer being located in the housing, wherein a diameter of the discharging portion is in a range of about 9 mm to about 16 mm.

2. The apparatus as claimed in claim 1, wherein the discharging portion discharges the polishing pad composition mixed with the pore forming material at a velocity of about 10 kgf/min to about 30 kgf/min through the discharging portion.

3. The apparatus as claimed in claim 1, wherein the discharging portion includes polyvinyl chloride (PVC).

4. The apparatus as claimed in claim 1, further comprising:
a drying container facing the discharging portion and spaced apart from the discharging portion.

5. The apparatus as claimed in claim 1, further comprising:
a heating part that increases a temperature of the polishing pad composition and the pore forming material in the housing.

6. The apparatus as claimed in claim 1, wherein the polishing pad composition includes at least one selected from the group of a polyethylene resin, a polypropylene resin, a polystyrene resin, a polyvinylchloride resin, a polyamide resin, an acryl resin, a polyurethane resin, a polycarbonate resin, a phenol resin, an amino resin, an epoxy resin, a polyester resin, rubber, acrylonitrile butadiene styrene (ABS), and a styrene acrylonitrile copolymer (SAN).

7. The apparatus as claimed in claim 1, wherein the pore forming material includes an inert gas, an encapsulating blowing agent, and/or a chemical blowing agent.

8. A method of manufacturing a polishing pad, the method comprising:

providing a polishing pad composition and a pore forming material in a mixing chamber;

mixing the polishing pad composition and the pore forming material by a stirrer of the mixing chamber to form pores in the polishing pad composition;

discharging the polishing pad composition including the pores from the mixing chamber through a discharging portion of the mixing chamber at a velocity of about 10 kgf/min to about 30 kgf/min;

drying the discharged polishing pad composition including the pores to form a polishing pad mold; and cutting the polishing pad mold to form polishing pads.

9. The method as claimed in claim 8, wherein a diameter of the discharging portion is in the range of about 9 mm to about 16 mm.

10. The method as claimed in claim 8, wherein the mixing chamber is heated at a temperature of about 70° C. to about 85° C.

11. The method as claimed in claim 8, wherein a portion of the pore forming material remains in the polishing pad composition discharged through the discharging portion such that the remaining pore forming material additionally generates pores in the discharged polishing pad composition.

12. An apparatus for manufacturing a polishing pad, the apparatus comprising:

a housing including a body, an interconnection portion, and a discharging portion; and a drying container spaced apart from and facing the discharging portion, the discharging portion of the housing being configured to discharge a mixture of a polishing pad composition and a pore forming material from the housing to the drying container at a velocity of about 10 kgf/min to about 30 kgf/min.

13. The apparatus as claimed in claim 12, wherein a diameter of the discharging portion is in a range of about 9 mm to about 16 mm.

14. The apparatus as claimed in claim 12, wherein the housing includes a stirrer located in the housing, the stirrer mixing the polishing pad composition and the pore forming material with each other in the housing to form the mixture of the polishing pad composition and the pore forming material.

15. The apparatus as claimed in claim 14, further including a heater that heats the mixture of the polishing pad composition and the pore forming material in the housing.

\* \* \* \* \*